(12) United States Patent
Frolikov

(10) Patent No.: US 12,730,730 B2
(45) Date of Patent: Sep. 8, 2026

(54) CUSTOM ERROR RECOVERY IN SELECTED REGIONS OF A DATA STORAGE DEVICE

(71) Applicant: Micron Technology, Inc., Boise, ID (US)

(72) Inventor: Alex Frolikov, San Jose, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/352,613

(22) Filed: Jul. 14, 2023

(65) Prior Publication Data

US 2023/0359535 A1 Nov. 9, 2023

Related U.S. Application Data

(63) Continuation of application No. 17/326,138, filed on May 20, 2021, now Pat. No. 11,704,210, which is a continuation of application No. 16/392,338, filed on Apr. 23, 2019, now Pat. No. 11,061,787.

(51) Int. Cl.
*G06F 11/00* (2006.01)
*G06F 3/06* (2006.01)
*G06F 11/20* (2006.01)

(52) U.S. Cl.
CPC ........ *G06F 11/2094* (2013.01); *G06F 3/0619* (2013.01); *G06F 3/0644* (2013.01); *G06F 3/0679* (2013.01); *G06F 2201/82* (2013.01)

(58) Field of Classification Search
CPC ............. G06F 11/1048; G06F 11/1044; G06F 11/1008; G06F 11/073; G06F 11/0727; G06F 11/0793; G06F 11/2094; G06F 3/0644; G06F 3/0619
See application file for complete search history.

(56) References Cited

U.S. PATENT DOCUMENTS

| | | | | |
|---|---|---|---|---|
| 9,542,119 | B2 | 1/2017 | Klein | |
| 10,802,908 | B2 | 10/2020 | Pele et al. | |
| 11,061,787 | B2 | 7/2021 | Frolikov | |
| 11,630,720 | B2 * | 4/2023 | Alavi | G06F 11/0727 714/15 |
| 11,704,210 | B2 | 7/2023 | Frolikov | |
| 2004/0153606 | A1 | 8/2004 | Schott | |
| 2009/0070651 | A1 | 3/2009 | Diggs et al. | |

(Continued)

OTHER PUBLICATIONS

Yixin Luo, et al. "Heterogeneous-Reliability Memory: Exploiting Application-Level Memory Error Tolerance." Carnegie Mellon University, et al., May 10, 2018.

(Continued)

*Primary Examiner* — Marc Duncan
(74) *Attorney, Agent, or Firm* — Greenberg Traurig

(57) ABSTRACT

A memory sub-system having non-volatile media on which multiple namespaces are allocated. A command from a host system has an identification of a namespace and at least one error recovery parameter. A controller of the memory sub-system configures the namespace on the non-volatile media according to the at least one error recovery parameter, stores the at least one error recovery parameter in association with the namespace, and controls error recovery operations for data access in the namespace in accordance with the at least one error recovery parameter stored in association with the namespace.

20 Claims, 5 Drawing Sheets

(56) References Cited

U.S. PATENT DOCUMENTS

| | | | | |
|---|---|---|---|---|
| 2014/0019823 | A1 | 1/2014 | Ramirez et al. | |
| 2014/0195651 | A1 | 7/2014 | Stockhammer et al. | |
| 2014/0281040 | A1 | 9/2014 | Liu | |
| 2016/0041870 | A1 * | 2/2016 | Davis .................. | H03M 13/373 714/773 |
| 2016/0062663 | A1 | 3/2016 | Samuels et al. | |
| 2016/0373324 | A1 | 12/2016 | Gholmieh et al. | |
| 2017/0024276 | A1 | 1/2017 | Kanno | |
| 2019/0004964 | A1 | 1/2019 | Kanno | |
| 2020/0104056 | A1 | 4/2020 | Benisty et al. | |
| 2020/0218460 | A1 | 7/2020 | Kankani et al. | |
| 2020/0218603 | A1 | 7/2020 | Singhai et al. | |
| 2020/0341870 | A1 | 10/2020 | Frolikov | |
| 2021/0271579 | A1 | 9/2021 | Frolikov | |

OTHER PUBLICATIONS

Kim, Chanha, et al., "Extending Lifetime of Flash Memory Using Strong Error Correction Coding." IEEE Transactions on Consumer Electronics, vol. 61 No. 2, IEEE, May 2015.

Li, Yong-jin, et al., "Survey and design of chip-error correcting algorithm in memory system." Abstract only, Computer Engineering & Science, Apr. 30, 2013.

Custom Error Recovery in Selected Regions of a Data Storage Device, U.S. Appl. No. 16/392,338, filed Apr. 23, 2019, Jun. 23, 2021, Alex Frolikov, Patented Case.

Custom Error Recovery in Selected Regions of a Data Storage Device, U.S. Appl. No. 17/326,138, filed May 20, 2021, Jul. 6, 2023, Alex Frolikov, Patented Case.

* cited by examiner

CUSTOM ERROR RECOVERY IN SELECTED REGIONS OF A DATA STORAGE DEVICE

RELATED APPLICATIONS

The present application is a continuation application of U.S. patent application Ser. No. 17/326,138, filed May 20, 2021, issued as U.S. Pat. No. 11,704,210 on Jul. 18, 2023, and entitled "Custom Error Recovery in Selected Regions of a Data Storage Device," which is a continuation application of U.S. patent application Ser. No. 16/392,338, filed Apr. 23, 2019, issued as U.S. Pat. No. 11,061,787 on Jul. 13, 2021, and entitled "Custom Error Recovery in Selected Regions of a Data Storage Device," the entire disclosure of which is hereby incorporated herein by reference.

FIELD OF THE TECHNOLOGY

At least some embodiments disclosed herein relate to memory systems in general, and more particularly, but not limited to customization of error recovery in data storage devices.

BACKGROUND

A memory sub-system can include one or more memory components that store data. A memory sub-system can be a data storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). The memory components can be, for example, non-volatile memory components and volatile memory components. Examples of memory components include memory integrated circuits. Some memory integrated circuits are volatile and require power to maintain stored data. Some memory integrated circuits are non-volatile and can retain stored data even when not powered. Examples of non-volatile memory include flash memory, Read-Only Memory (ROM), Programmable Read-Only Memory (PROM), Erasable Programmable Read-Only Memory (EPROM) and Electronically Erasable Programmable Read-Only Memory (EEPROM), etc. Examples of volatile memory include Dynamic Random-Access Memory (DRAM) and Static Random-Access Memory (SRAM). In general, a host system can utilize a memory sub-system to store data at the memory components and to retrieve data from the memory components.

A computer can include a host system and one or more memory sub-systems attached to the host system. The host system can have a central processing unit (CPU) in communication with the one or more memory sub-systems to store and/or retrieve data and instructions. Instructions for a computer can include operating systems, device drivers, and application programs. An operating system manages resources in the computer and provides common services for application programs, such as memory allocation and time sharing of the resources. A device driver operates or controls a specific type of devices in the computer; and the operating system uses the device driver to offer resources and/or services provided by the type of devices. A central processing unit (CPU) of a computer system can run an operating system and device drivers to provide the services and/or resources to application programs. The central processing unit (CPU) can run an application program that uses the services and/or resources. For example, an application program implementing a type of applications of computer systems can instruct the central processing unit (CPU) to store data in the memory components of a memory sub-system and retrieve data from the memory components.

A host system can communicate with a memory sub-system in accordance with a pre-defined communication protocol, such as Non-Volatile Memory Host Controller Interface Specification (NVMHCI), also known as NVM Express (NVMe), which specifies the logical device interface protocol for accessing non-volatile storage devices via a Peripheral Component Interconnect Express (PCI Express or PCIe) bus. In accordance with the communication protocol, the host system can send commands of different types to the memory sub-system; and the memory sub-system can execute the commands and provide responses to the commands. Some commands instruct the memory sub-system to store data items at addresses specified in the commands, or to retrieve data items from addresses specified in the commands, such as read commands and write commands. Some commands manage the infrastructure in the memory sub-system and/or administrative tasks, such as commands to manage namespaces, commands to attach namespaces, commands to create input/output submission or completion queues, commands to delete input/output submission or completion queues, commands for firmware management, etc.

Date retrieved from a memory component in a read operation may contain errors. The controller of a data storage device/system may retry the read operation to obtain error-free data. For example, a negative-and (NAND) type flash memory can be used to store one or more bits of data in a memory cell by programming the voltage threshold level of the memory cell. When the voltage threshold level is within a voltage window, the memory cell is in a state associated with the voltage window and thus storing one or more bits of values pre-associated with the state. However, various factors (e.g., temperature, time, charge leakage) can cause the voltage threshold of a memory cell to shift outside of the voltage window, causing an error in the determination of the data stored in the memory cell. The data storage device/system can retry the read operation with different voltage threshold to reduce and/or eliminate errors.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
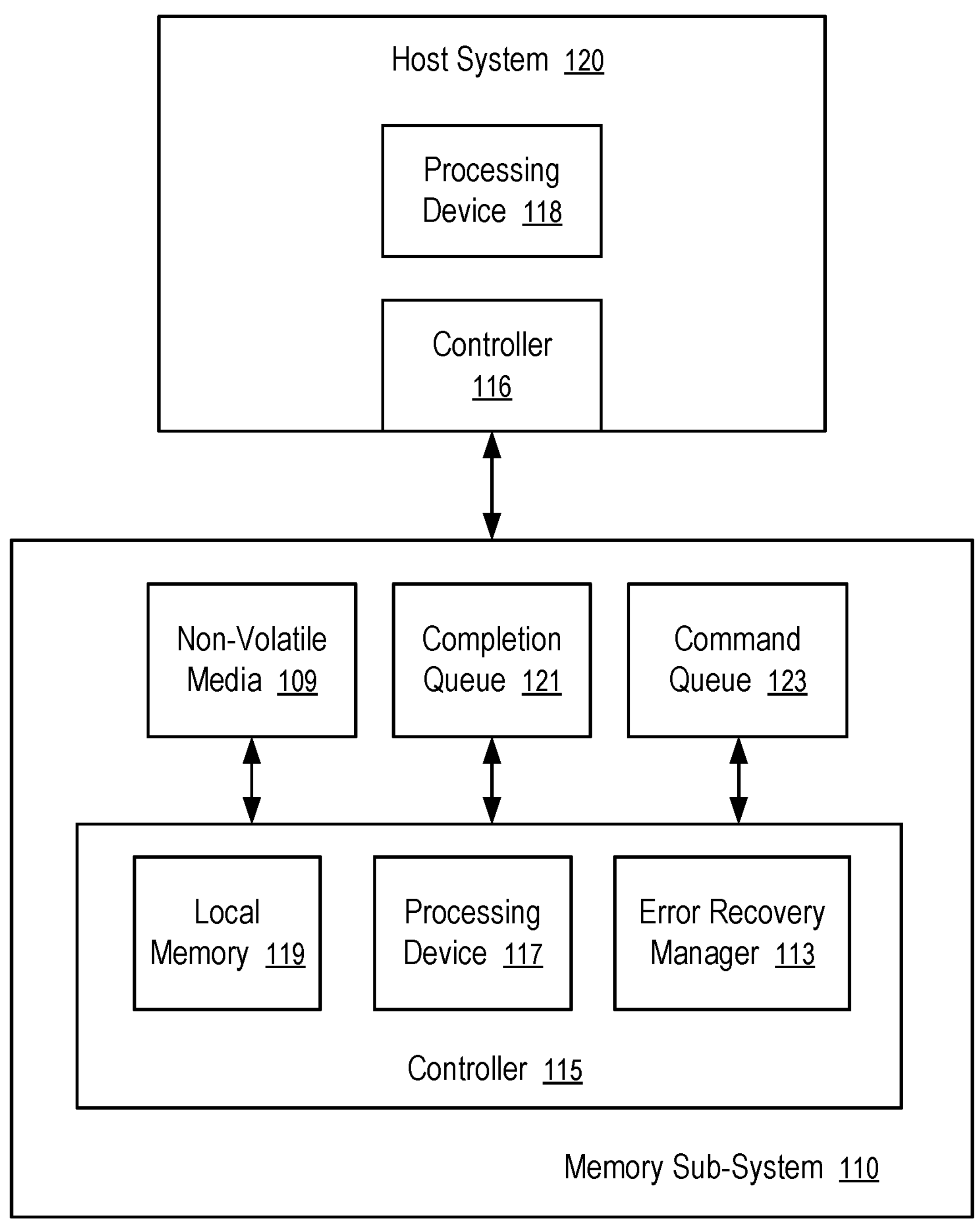
FIG. 1 illustrates an example computing system having a memory sub-system in accordance with some embodiments of the present disclosure.

At least some aspects of the present disclosure are directed to techniques of customizing error recovery for selected portions of storage capacity of a data storage device.

Error recovery operations in a data storage device reduces the speed for data access. It is advantageous to customize error recovery for different data applications to access performance and accuracy. For example, certain data applications (e.g., video, audio, image data) can tolerate a level of errors in retrieved data without significant impact on the performance of the applications. However, some data applications, such as instruction codes and file system data, must be as error-free as possible. Thus, prolonged read operations due to repeated retries to retrieve error-free data for such data application can be desirable. In general, a computing device can have different types of data applications.

In at least some embodiments disclosed herein, error recovery settings are configured based on namespaces. A namespace can be dynamically mapped to different portions and/or locations in a data storage device. When different namespaces can have different error recovery settings, a computing device can use different namespaces to store data of different categories such that the trade-off between data access performance and accuracy for different data applications can be achieved by storing respective data in differently customized namespaces.

A namespace configured on a storage device can be considered a logical storage device dynamically allocated on a portion of the storage device. Multiple namespaces configured on a storage device correspond to different logical storage devices that are implemented using different portions of the storage capacity of the storage device. A computer system can access a storage unit in a logical storage device represented by a namespace by identifying the namespace and a logical block addressing (LBA) address defined within the namespace. Different namespaces can have separate LBA address spaces. For example, a first namespace allocated on a first portion of the storage device having n memory units can have LBA addresses ranging from 0 to n−1; and a second namespace allocated on a second portion of the storage device having m memory units can have LBA addresses ranging from 0 to m−1. A same LBA address can be used in different namespaces to identify different memory units in different portions of the storage device.

The logical address space defined in a namespace can be mapped to the address space in the storage device using a namespace map. For example, the LBA address space defined in a namespace that is allocated on a portion of the storage device can be mapped blockwise according to a customizable block size to an LBA address space of an imaginary namespace that could be defined on the entire capacity of the storage device. The block size of the namespace map can be configured to balance the flexibility in defining the namespace in terms of blocks in the imaginary namespace and the overhead in performing the address translation using the namespace map. The addresses in the imaginary namespace defined on the entire capacity can be further translated to physical addresses (e.g., via a flash translation layer (FTL) of the storage device) in a way that is independent of namespaces. Thus, the complexity of namespaces is isolated from the operations of the flash translation layer (FTL). Further details of such techniques of namespace mapping can be found in U.S. Pat. No. 10,223,254, issued on Mar. 5, 2019 and entitled "Namespace Change Propagation in Non-Volatile Memory Devices," the entire disclosure of which is hereby incorporated herein by reference.

In general, the host computer of a storage device may send a request to the storage device for the creation, deletion, or reservation of a namespace. After a portion of the storage capacity of the storage device is allocated to a namespace, an LBA address in the respective namespace logically represents a particular memory unit in the data storage media of the storage device, although the particular memory unit logically represented by the LBA address in the namespace may physically correspond to different memory units at different time instances (e.g., as in SSDs) (e.g., as determined by the flash translation layer (FTL) of the storage device).

In general, a memory sub-system can also be referred to as a "memory device". An example of a memory sub-system is a memory module that is connected to a central processing unit (CPU) via a memory bus. Examples of memory modules include a dual in-line memory module (DIMM), a small outline DIMM (SO-DIMM), a non-volatile dual in-line memory module (NVDIMM), etc.

Another example of a memory sub-system is a data storage device/system that is connected to the central processing unit (CPU) via a peripheral interconnect (e.g., an input/output bus, a storage area network). Examples of storage devices include a solid-state drive (SSD), a flash drive, a universal serial bus (USB) flash drive, and a hard disk drive (HDD).

In some embodiments, the memory sub-system is a hybrid memory/storage sub-system that provides both memory functions and storage functions. In general, a host system can utilize a memory sub-system that includes one or more memory components. The host system can provide data to be stored at the memory sub-system and can request data to be retrieved from the memory sub-system.

FIG. 1 illustrates an example computing system having a memory sub-system (110) in accordance with some embodiments of the present disclosure.

The memory sub-system (110) can include non-volatile media (109) that includes memory components. In general, memory components can be volatile memory components, non-volatile memory components, or a combination of such. In some embodiments, the memory sub-system (110) is a data storage system. An example of a data storage system is an SSD. In other embodiments, the memory sub-system (110) is a memory module. Examples of a memory module includes a DIMM, NVDIMM, and NVDIMM-P. In some embodiments, the memory sub-system (110) is a hybrid memory/storage sub-system.

In general, the computing environment can include a host system (120) that uses the memory sub-system (110). For example, the host system (120) can write data to the memory sub-system (110) and read data from the memory sub-system (110).

The host system (120) can be part of a computing device, such as a desktop computer, laptop computer, network server, mobile device, or such computing device that includes a memory and a processing device. The host system (120) can include or be coupled to the memory sub-system (110) so that the host system (120) can read data from or write data to the memory sub-system (110). The host system (120) can be coupled to the memory sub-system (110) via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, etc. The physical host interface can be used to transmit data and/or commands between the host system (120) and the memory sub-system (110). The host system (120) can further utilize an NVM Express (NVMe) interface to access the non-volatile media (109) when the memory sub-system (110) is coupled with the host system (120) by the PCIe interface. The physical host interface can provide an interface for passing control, address, data, and other signals between the memory sub-system (110) and the host system (120). FIG. 1 illustrates a memory sub-system (110) as an example. In general, the host system (120) can access multiple memory sub-systems via a same communication connection, multiple separate communication connections, and/or a combination of communication connections.

The host system (120) includes a processing device (118) and a controller (116). The processing device (118) of the host system (120) can be, for example, a microprocessor, a central processing unit (CPU), a processing core of a processor, an execution unit, etc. In some instances, the controller (116) can be referred to as a memory controller, a memory management unit, and/or an initiator. In one example, the controller (116) controls the communications over a bus coupled between the host system (120) and the memory sub-system (110).

In general, the controller (116) can send commands or requests to the memory sub-system (110) for desired access to non-volatile media (109). The controller (116) can further include interface circuitry to communicate with the memory sub-system (110). The interface circuitry can convert responses received from memory sub-system (110) into information for the host system (120).

The controller (116) of the host system (120) can communicate with controller (115) of the memory sub-system (110) to perform operations such as reading data, writing data, or erasing data in the non-volatile media (109) and other such operations. In some instances, the controller (116) is integrated within the same package of the processing device (118). In other instances, the controller (116) is separate from the package of the processing device (118). The controller (116) and/or the processing device (118) can include hardware such as one or more integrated circuits and/or discrete components, a buffer memory, a cache memory, or a combination thereof. The controller (116) and/or the processing device (118) can be a microcontroller, special purpose logic circuitry (e.g., a field programmable gate array (FPGA), an application specific integrated circuit (ASIC), etc.), or another suitable processor.

The non-volatile media (109) can include any combination of the different types of non-volatile memory components. In some instances, volatile memory components can also be used. An example of non-volatile memory components includes a negative-and (NAND) type flash memory. A memory component in the media (109) can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and an MLC portion of memory cells. Each of the memory cells can store one or more bits of data (e.g., data blocks) used by the host system (120). Although non-volatile memory components such as NAND type flash memory are described, the memory components used in the non-volatile media (109) can be based on any other type of memory. Further, a volatile memory can be used. In some embodiments, the memory components in the media (109) can include, but are not limited to, random access memory (RAM), read-only memory (ROM), dynamic random access memory (DRAM), synchronous dynamic random access memory (SDRAM), phase change memory (PCM), magneto random access memory (MRAM), Spin Transfer Torque (STT)-MRAM, ferroelectric random-access memory (FeTRAM), ferroelectric RAM (FeRAM), conductive bridging RAM (CBRAM), resistive random access memory (RRAM), oxide based RRAM (OxRAM), negative-or (NOR) flash memory, electrically erasable programmable read-only memory (EEPROM), nanowire-based non-volatile memory, memory that incorporates memristor technology, or a cross-point array of non-volatile memory cells, or any combinations thereof. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components in the media (109) can be grouped as memory pages or data blocks that can refer to a unit of the memory component used to store data.

The controller (115) of the memory sub-system (110) can communicate with the memory components in the media (109) to perform operations such as reading data, writing data, or erasing data at the memory components and other such operations (e.g., in response to commands scheduled on a command bus by controller (116)). The controller (115) can include hardware such as one or more integrated circuits and/or discrete components, a buffer memory, or a combination thereof. The controller (115) can be a microcontroller, special purpose logic circuitry (e.g., a field programmable gate array (FPGA), an application specific integrated circuit (ASIC), etc.), or another suitable processor. The controller (115) can include a processing device (117) (e.g., processor) configured to execute instructions stored in local memory (119). In the illustrated example, the buffer memory (119) of the controller (115) includes an embedded memory configured to store instructions for performing various processes, operations, logic flows, and routines that control operation of the memory sub-system (110), including handling communications between the memory sub-system (110) and the host system (120). In some embodiments, the controller (115) can include memory registers storing memory pointers, fetched data, etc. The controller (115) can also include read-only memory (ROM) for storing micro-code. While the example memory sub-system (110) in FIG. 1 has been illustrated as including the controller (115), in another embodiment of the present disclosure, a memory sub-system (110) may not include a controller (115), and can instead rely upon external control (e.g., provided by an external host, or by a processor or controller separate from the memory sub-system).

In general, the controller (115) can receive commands or operations from the host system (120) and can convert the commands or operations into instructions or appropriate commands to achieve the desired access to the memory components in the media (109). The controller (115) can be responsible for other operations such as wear leveling operations, garbage collection operations, error detection and error-correcting code (ECC) operations, encryption operations, caching operations, and address translations between a logical block address and a physical block address that are associated with the memory components in the media (109). The controller (115) can further include host interface circuitry to communicate with the host system (120) via the physical host interface. The host interface circuitry can convert the commands received from the host system into command instructions to access the memory components in the media (109) as well as convert responses associated with the memory components into information for the host system (120).

The memory sub-system (110) can also include additional circuitry or components that are not illustrated. In some embodiments, the memory sub-system (110) can include a cache or buffer (e.g., DRAM) and address circuitry (e.g., a row decoder and a column decoder) that can receive an address from the controller (115) and decode the address to access the memory components of the media (109).

The computing system includes an error recovery manager (113) in the memory sub-system (110) that apply different error recovery preferences/settings for different portions of the non-volatile media (109) based on parameters set for namespaces.

In some embodiments, the controller (115) in the memory sub-system (110) includes at least a portion of the error recovery manager (113). In other embodiments, or in combination, the controller (116) and/or the processing device (118) in the host system (120) includes at least a portion of the error recovery manager (113). For example, the controller (115), the controller (116), and/or the processing device (118) can include logic circuitry implementing the error recovery manager (113). For example, the controller (115), or the processing device (118) (processor) of the host system (120), can be configured to execute instructions stored in memory for performing the operations of the error recovery manager (113) described herein. In some embodiments, the error recovery manager (113) is implemented in an integrated circuit chip disposed in the memory sub-system (110). In other embodiments, the error recovery manager (113) is part of an operating system of the host system (120), a device driver, or an application.

The memory sub-system (110) can have one or more queues (e.g., 123) for receiving commands from the host system (120). For example, the queue (123) can be configured for typical input/output commands, such as read commands and write commands. For example, the queue (123) can be configured for admin commands that are not typical input/output commands. The memory sub-system (110) can include one or more completion queue (121) for the reporting, to the host system (120), the results of the executions of commands in the command queues (123).

The error recovery manager (113) is configured to control operations related to the error processing in the memory sub-system (110). For example, data retrieved from the non-volatile media (109) is detected to contain errors (e.g., in error detection and error-correcting code (ECC) operations), the error recovery manager (113) is configured to determine the namespaces in which the errors occur. The error recovery settings of the respective namespaces are retrieved to control the error recovery process. For example, when an error is detected in a specific namespace, a threshold level of retry read operation associated with the specific namespace is retrieved; and the error recovery manager (113) configures the controller (115) to perform no more than the threshold level of retry of read operations in an attempt to read error-free data. If the controller (115) fails to retrieve error-free data with the threshold level of retry read operations, the controller (115) is configured to provide a version of the retrieved data (e.g., with less errors) in the completion queue (121) for reporting to the host system (120). Optionally, a flag can be set in the response provided in the completion queue (121) to indicate that the retrieved data contains errors. Further, the error recovery manager (113) can configure a namespace to store data using a RAID (Redundant Array of Independent Disks) configuration to improve error tolerance for data stored in the namespace. Alternatively, or in combination, the error recovery manager (113) can configure a namespace such that the memory units in the namespace store data in a mode that has a desired level of reliability in data retrieval. For example, the error recovery manager (113) can be configured a namespace to operate the memory units allocated for the non-volatile media (109) in an SLC mode (e.g., instead of in an MLC, TLC, or QLC mode) to improve longevity of the memory units and/or data access speed, with reduced storage capacity, as further discussed below.

Figure 2:
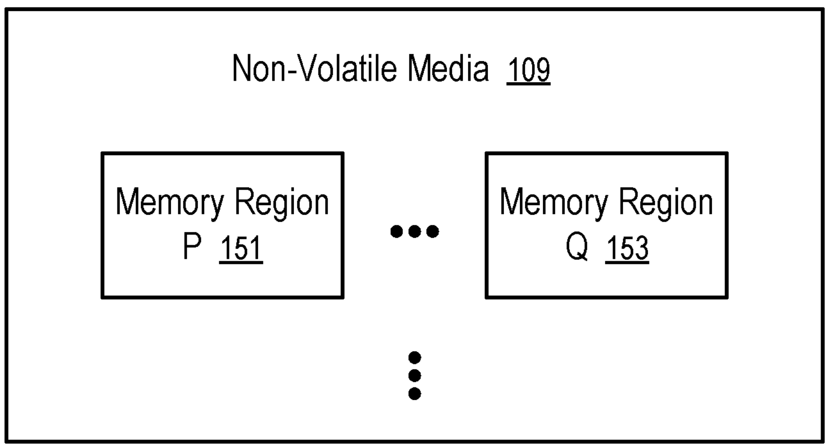
FIG. 2 illustrates the customization of namespaces for different error recovery operations.
Figure 2:
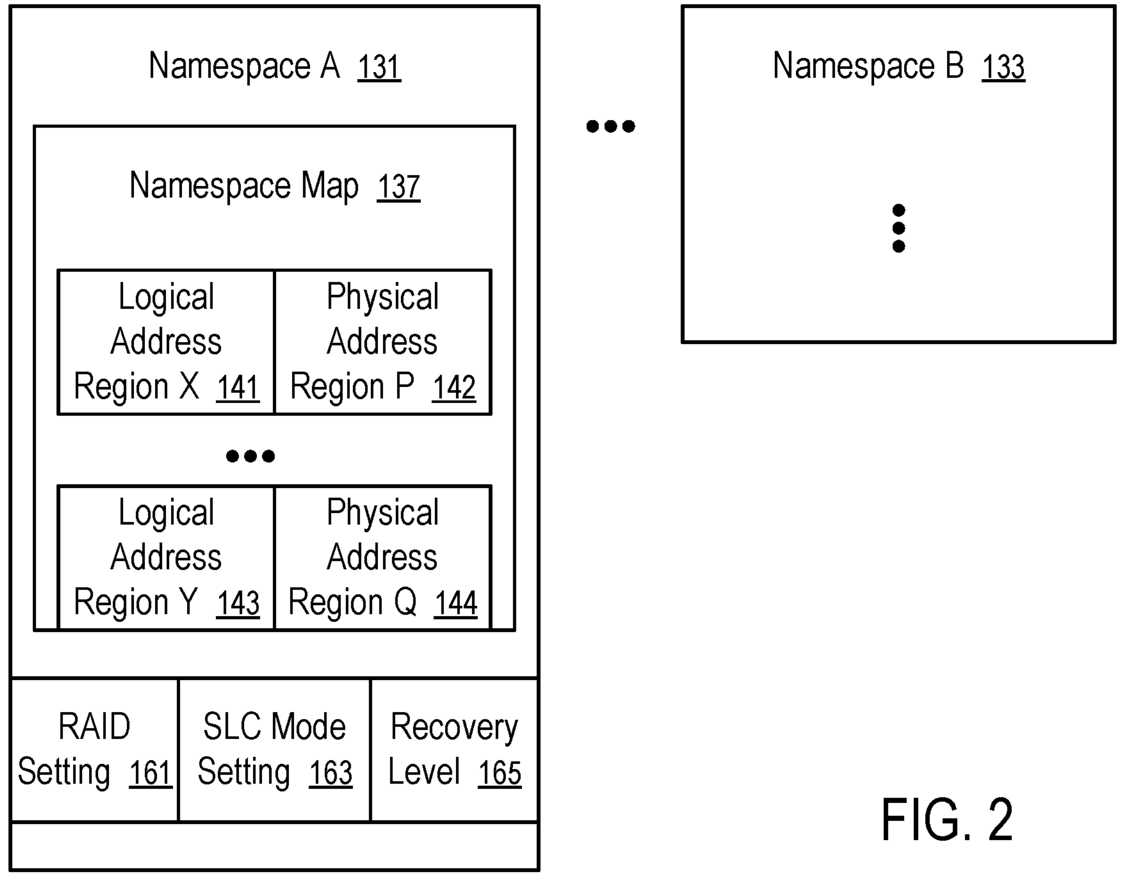

FIG. 2 illustrates the customization of namespaces (131, . . . , 133) for different error recovery operations.

In FIG. 2, multiple namespaces (131, . . . , 133) are allocated on the non-volatile media (109) (e.g., in a memory sub-system (110) illustrated in FIG. 1).

For example, the namespace A (131) has a namespace map (137) that defines the mapping between logical address regions (141, . . . , 143) in the namespace (131) and physical address regions (142, . . . , 144) of the corresponding memory regions (151, . . . , 153) in the non-volatile media (109). Using the namespace map (137), a read or write operation requested for a logical address defined in the namespace (131) can be translated for a corresponding read or write operation in the memory region (151, . . . , or 153) in the non-volatile media (109).

FIG. 2 illustrates a simplified example of a namespace map (137) that maps the logical address regions (141, . . . , 143) to the physical address regions (142, . . . , 144). In an improved mapping technique, the logical address regions (141, . . . , 143) in the namespace (131) can be mapped to logical address regions (141, . . . , 143) in an imaginary namespace is that configured on the entire non-volatile media (109); and a flash translation layer can be configured to further map the logical address regions (141, . . . , 143) in the imaginary namespace into memory units in the non-volatile media (109), as discussed in U.S. Pat. No. 10,223,254, issued on Mar. 5, 2019 and entitled "Namespace Change Propagation in Non-Volatile Memory Devices," the entire disclosure of which is hereby incorporated herein by reference. Thus, the error-recovery techniques of the present disclosure are not limited to a specific technique of namespace mapping.

In FIG. 2, the namespace A (131) can have multiple configuration parameters related to error recovery operations, such as RAID setting (161), SLC mode setting (163), and/or a threshold level (165) for error recovery.

For example, different namespaces (131, . . . , 133) can have different RAID settings (e.g., 161). For example, the namespace A (131) can be configured to have RAID operations; and the namespace B (133) can be configured to have no RAID operations.

Optionally, the error recovery manager (113) can be configured to support multiple levels of RAID operations, such as mirroring, parity, byte-level striping with parity, block-level striping with parity, block-level striping with distributed parity.

For example, when the namespace (131) is configured to enable RAID operations, the error recovery manager (113) configures the namespace map (137) to map from the logical address regions (141, . . . , 143) in the namespace (131) to multiple sets of physical address regions (e.g., 142, . . . , 144). Such mapping can be performed by mapping the logical address regions (141, . . . , 143) defined in the namespace (131) into separate sets of logical address regions defined in the imaginary namespace that is allocated on the entire capability of the non-volatile media (109), where the flash translation layer is configured to map the logical address regions defined in the imaginary namespace into physical addresses in the non-volatile media (109) in a way independent of namespaces and/or the RAID operations of the namespaces. Thus, the operations of the flash translation layer can be independent of namespaces and/or RAID considerations. The error recovery manager (113) can translate the RAID operations in the namespace (131) into separate operations in the different sets of logical address regions defined in the imaginary namespace; and thus, RAID operations can be enabled/disable without changing the operations/functionalities of the flash translation layer.

Different namespaces (131, . . . , 133) can have different SLC mode settings (e.g., 163). For example, the namespace A (131) can be configured to operate in SLC mode; and the namespace B (133) can be configured to operate in a non-SLC mode (e.g., in MLC/TLC/QLC mode).

When the namespace (131) is configured to be in a mode with reduced storage capacity for improved access speed, reduced error rate, and/or improved service life in terms of erase program cycles, the error recovery manager (113) can configure the namespace map (137) to map the logical address regions (e.g., 141, . . . , 143) defined in the namespace (131) into multiple sets of logical address regions defined in the imaginary namespace and translate the operations in the namespace (131) into corresponding operations in the imaginary namespace, in a way similar to the RAID operations. In general, such a mode with reduced storage capacity for improved access speed, reduced error rate, and/or improved service life in terms of erase program cycles can be implemented via RAID and/or reducing the number of bits stored per memory cell (e.g., reducing from QLC mode to MLC mode or SLC mode).

Different namespaces (131, . . . , 133) can have different levels (e.g., 165) for error recovery. For example, the namespace A (131) can be configured to limit retry of read operations at a first threshold that is larger than the threshold for the namespace B (133), such that when the namespace A (131) and the namespace B (133) have the same other settings, the namespace A (131) is configured for less errors, while the namespace B (133) is configured for improved access speed at a tolerable error level. In some implementations, the recovery level (165) identifies a fixed limit for retry of input/output operations. In other implementations, the recovery level (165) identifies an error rate such that when the retrieved data has an error rate lower than specified by the recovery level (165), further retry can be skipped.

The error recovery settings (e.g., 161, 163, and 165) allows the namespace (131) to be customized with a specific trade-off in performance, capacity and data error. Thus, different namespaces (e.g., 131, 133) can be customized as logical storage devices having different error recovery characteristics, using the same underlying non-volatile media (109).

For example, some data is used in situations where errors are not tolerated, such as instructions for an operating system and/or application programs, meta data of a file system. Such data can be stored in a namespace (e.g., 131) that is configured to perform exhaustive error recovery, use memory cells in SLC mode, and/or perform RAID operations for data redundancy and recovery.

For example, some data can tolerate a level of errors in retrieved data, such as video files, audio files, and/or image files. Such data can be stored in a namespace (e.g., 133) that is configured to perform less data error recovery operations in the event of errors.

The settings (e.g., 161, 163, 165) related to error recovery operations of the namespace can be specified by the host system (120) using commands for the recreating and/or administration of the namespace (131).

For example, the host system (120) can submit a command to create the namespace (131) using a command queue (e.g., 123). The command includes the parameters for the settings (e.g., 161, 163, 165). In some instances, data specifying some of the settings is optionally; and the command can use a linked list to specify some of the settings in any order reflected in the linked list. Thus, the settings (e.g., 161, 163, 165) do not have to be specified in a specific order.

Further, after the creating of the namespace (131), the host system (120) may change some of the settings (e.g., 161, 163, 165) using a command sent to the memory sub-system (110) using a command queue (e.g., 123).

For example, the level (165) of error recovery operations of the namespace (131) can be changed on the fly using a command in the command queue (e.g., 123).

For example, a command from the host system (120) can change the SLC mode setting (163), or the RAID setting (161), after the namespace (131) is created. The error recovery manager (113) can implement the change by adjusting the namespace map (137) and/or re-store the data of the namespace (131) according to the updated settings.

In one embodiment, the error recovery manager (113) stores the settings (e.g., 161, 163, 165) for the namespaces (e.g., 131, . . . , 133) allocated in a memory sub-system (110) in a centralized error recovery table. When an input/output error occurs in a namespace (e.g., 131), the error recovery manager (113) retrieves the recovery level (e.g., 165) of the namespace (e.g., 131) from the error recovery table and controls the error recovery operations based on the recovery level (e.g., 165) of the namespace (e.g., 131).

Figure 3:
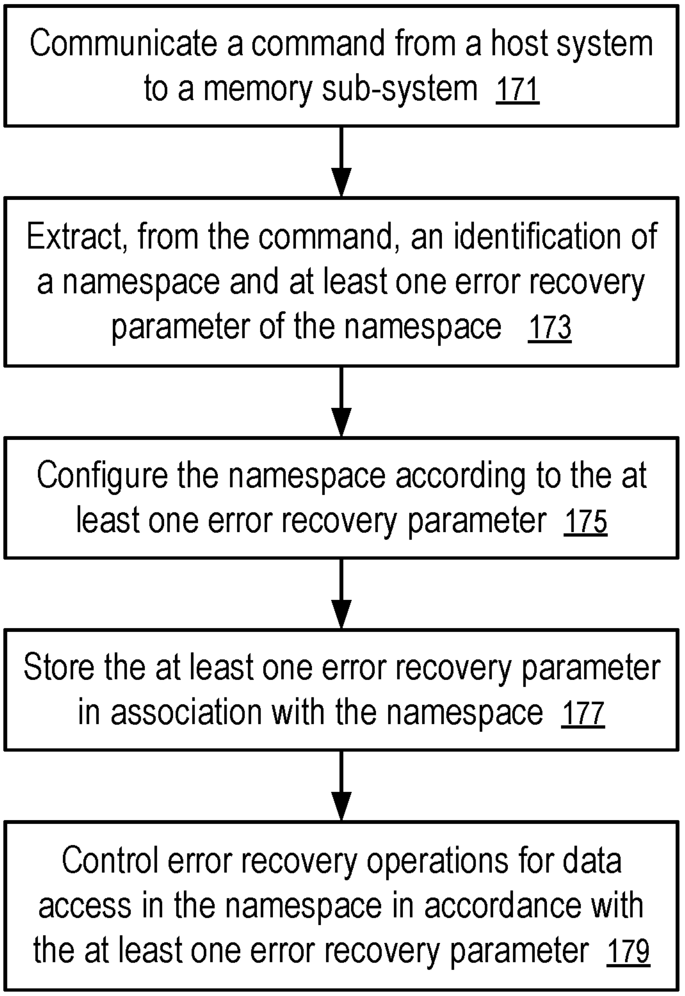
FIG. 3 shows a method to configure a namespace in a storage device.

FIG. 3 shows a method to configure a namespace (e.g., 131) in a storage device (e.g., 110). For example, the method of FIG. 3 can be implemented in a computer system of FIG. 1 using the technique discussed in connection with FIG. 2.

At block 171, a host system (120) communicates a command to a memory sub-system (110).

For example, the command can be communicated from the host system (120) to the memory sub-system (110) via a command queue (123) using a pre-defined communication protocol, such as Non-Volatile Memory Host Controller Interface Specification (NVMHCI), also known as NVM Express (NVMe).

The command can be a command to create a namespace, a command to configure a namespace, a command to change attributes of the namespace, or a command to adjust error recovery parameters in the namespace. The command includes an identification of the namespace (e.g., 131) and at least one error recovery parameter (e.g., 161, 163, 165) of the namespace (e.g., 131).

The memory sub-system (110) can be configured to support the customization of a predefined set of error recovery parameters (e.g., 161, 163, 165). Each parameter in the predefined set has a default value. The command does not have to explicitly identify the default value for the corresponding parameter for the namespace. Thus, it is sufficient to specify for parameters customized values that different from the default values.

At block 173, the controller (115) of the memory sub-system (110) extracts, from the command, an identification of a namespace (e.g., 131) and at least one error recovery parameter (e.g., 161, 163, and/or 165) of the namespace (e.g., 131).

At block 175, the controller (115) configures the namespace (131) according to the at least one error recovery parameter (e.g., 161, 163, and/or 165).

For example, when the RAID setting (161) requires RAID operations, the controller (115) can configure the namespace map (137) to the set of logical address regions (141, . . . , 143) defined in the namespace (131) into multiple sets of memory units in the non-volatile media (109) where each set of memory units can be treated as an independent disk for the RAID operations.

At block 177, the controller (115) stores the at least one error recovery parameter (e.g., 161, 163, and/or 165) in association with the namespace (e.g., 131).

For example, a centralized error recovery table can be used to store the values of the parameters (e.g., 161, 163, . . . , 165) for each namespace (e.g., 131) configured in the memory sub-system (110).

At block 179, the controller (115) controls error recovery operations for data access in the namespace (e.g., 131) in accordance with the at least one error recovery parameter stored in association with the namespace (e.g., 131).

For example, when the namespace (131) has redundant data stored according to the RAID setting (e.g., 161), the error recovery manager (113) can perform computations to recover error free data from the redundant data.

For example, when an input/output operation has an error that needs to be addressed via retry, the error recovery manager (113) limits the number of retry operations according to the recovery level (165). For example, a predetermined function, or a lookup table can be used to determine the maximum number of retry operations allowed by the recovery level (165). Once the maximum number of retry operations, the controller (115) can report the result of the input/output operation that has an error to the host system (120) via a completion queue (121), as illustrated in FIG. 4.

Figure 4:
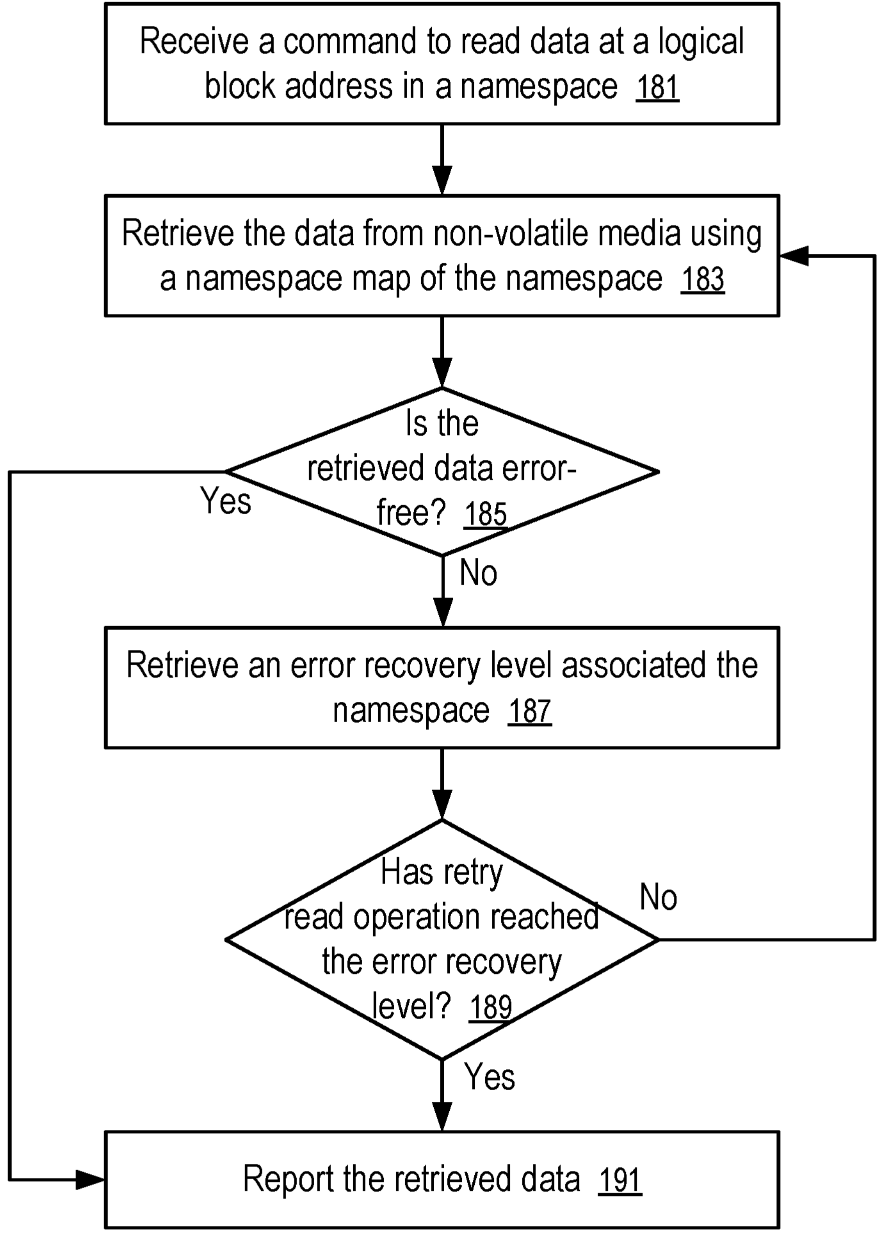
FIG. 4 shows a method to perform error recovery in a namespace.

FIG. 4 shows a method to perform error recovery in a namespace (e.g., 131). For example, the method of FIG. 4 can be implemented in a computer system of FIG. 1 using the technique discussed in connection with FIG. 2.

At block 181, a controller (115) receives a command to read data at a logical block address in the namespace (131).

At block 183, the controller (115) retrieves the data from non-volatile media (109) using a namespace map (137) of the namespace (131).

At block 185, the controller (115) determines whether the retrieved data error-free.

If the retrieved data is not error-free, the controller (115) retrieves an error recovery level (165) associated the namespace (137) at block 187. Otherwise, the controller reports the retrieved data at block 191.

At block 189, the controller (115) determines whether retry the read operation has reached the error recovery level associated with the namespace (137); and if so, the controller (115) reports the retrieved data at block 191. Otherwise, the controller (115) retrieves the data from non-volatile media (109) again using a namespace map (137) of the namespace (131) at block 183. For example, the controller (115) can adjust the parameters (e.g., references voltages) used in the read operation in an attempt to obtain error free data.

If the controller (115) determines at block (189) that retry the read operation has reached the error recovery level associated with the namespace (137), the controller (115) can report an error to the host system (120). For example, the error can be reported via a flag set in a response containing the retrieved data, or via a separate message.

In some implementations, a communication channel between the processing device (118) and a memory sub-system (110) includes a computer network, such as a local area network, a wireless local area network, a wireless personal area network, a cellular communications network, a broadband high-speed always-connected wireless communication connection (e.g., a current or future generation of mobile network link); and the processing device (118) and the memory sub-system can be configured to communicate with each other using data storage management and usage commands similar to those in NVMe protocol.

A memory sub-system (110) in general can have non-volatile storage media. Examples of non-volatile storage media include memory cells formed in an integrated circuit and magnetic material coated on rigid disks. Non-volatile storage media can maintain the data/information stored therein without consuming power. Memory cells can be implemented using various memory/storage technologies, such as NAND logic gate, NOR logic gate, phase-change memory (PCM), magnetic memory (MRAM), resistive random-access memory, cross point storage and memory devices (e.g., 3D XPoint memory). A cross point memory device uses transistor-less memory elements, each of which has a memory cell and a selector that are stacked together as a column. Memory element columns are connected via two perpendicular lays of wires, where one lay is above the memory element columns and the other lay below the memory element columns. Each memory element can be individually selected at a cross point of one wire on each of the two layers. Cross point memory devices are fast and non-volatile and can be used as a unified memory pool for processing and storage.

The controller (e.g., 115) of a memory sub-system (e.g., 110) can run firmware to perform operations responsive to the communications from the processing device (118). Firmware in general is a type of computer program that provides control, monitoring and data manipulation of engineered computing devices.

Some embodiments involving the operation of the controller (115) and/or the error recovery manager (113) can be implemented using computer instructions executed by the controller (115), such as the firmware of the controller (115). In some instances, hardware circuits can be used to implement at least some of the functions. The firmware can be initially stored in the non-volatile storage media, or another non-volatile device, and loaded into the volatile DRAM and/or the in-processor cache memory for execution by the controller (115).

A non-transitory computer storage medium can be used to store instructions of the firmware of a memory sub-system (e.g., 110). When the instructions are executed by the controller (115) and/or the processing device (117), the instructions cause the controller (115) and/or the processing device (117) to perform a method discussed above.

Figure 5:
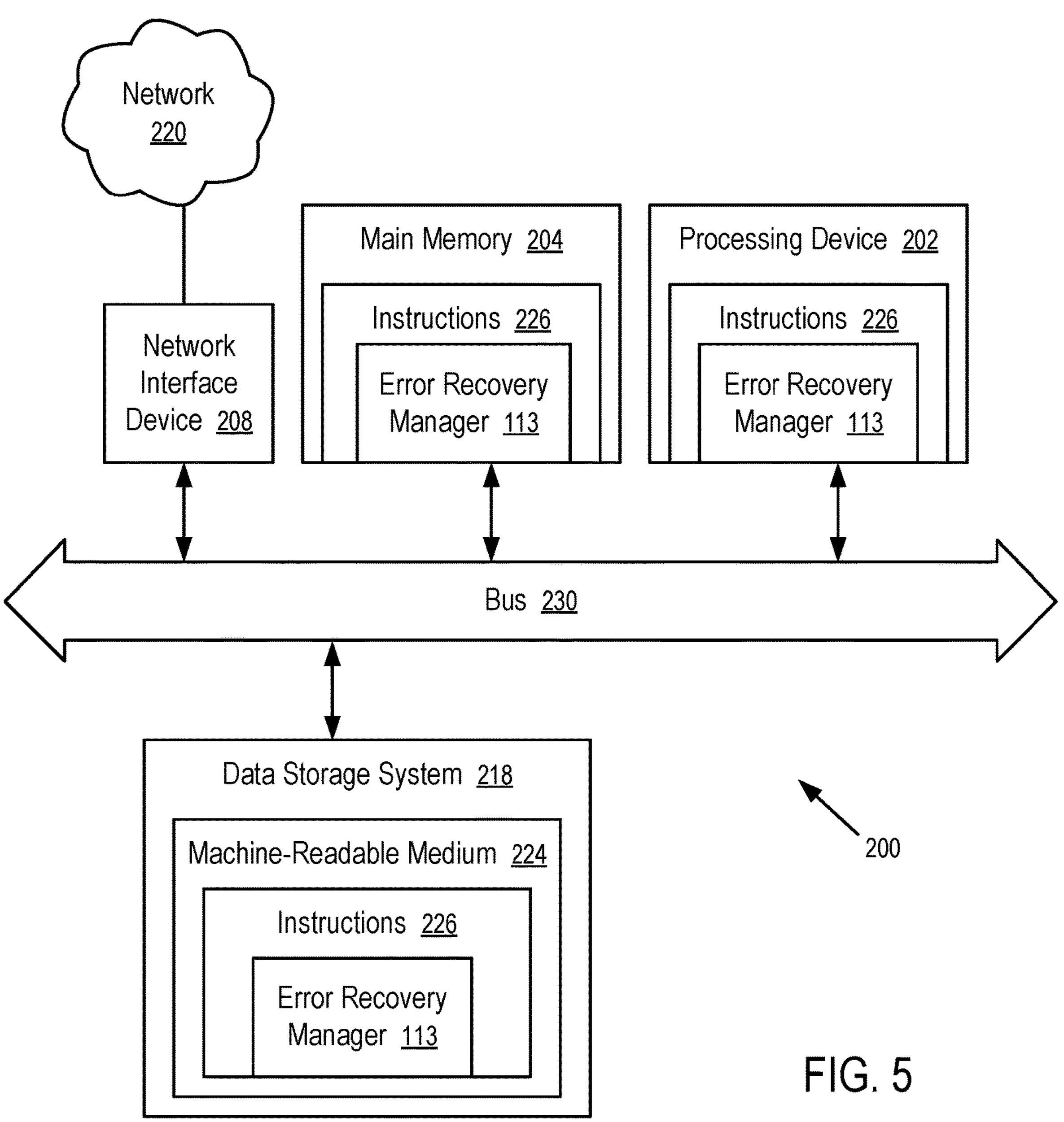
FIG. 5 is a block diagram of an example computer system in which embodiments of the present disclosure can operate.

FIG. 5 illustrates an example machine of a computer system (200) within which a set of instructions, for causing the machine to perform any one or more of the methodologies discussed herein, can be executed. In some embodiments, the computer system (200) can correspond to a host system (e.g., the host system (120) of FIG. 1) that includes, is coupled to, or utilizes a memory sub-system (e.g., the memory sub-system (110) of FIG. 1) or can be used to perform the operations of an error recovery manager (113) (e.g., to execute instructions to perform operations corresponding to the error recovery manager (113) described with reference to FIGS. 1-4). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system (200) includes a processing device (202), a main memory (204) (e.g., read-only memory (ROM), flash memory, dynamic random access memory (DRAM) such as synchronous DRAM (SDRAM) or Rambus DRAM (RDRAM), static random access memory (SRAM), etc.), and a data storage system (218), which communicate with each other via a bus (230) (which can include multiple buses).

Processing device (202) represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device (202) can also be one or more special-purpose processing devices such as an application specific integrated circuit (ASIC), a field programmable gate array (FPGA), a digital signal processor (DSP), network processor, or the like. The processing device (202) is configured to execute instructions (226) for performing the operations and steps discussed herein. The computer system (200) can further include a network interface device (208) to communicate over the network (220).

The data storage system (218) can include a machine-readable storage medium (224) (also known as a computer-readable medium) on which is stored one or more sets of instructions (226) or software embodying any one or more of the methodologies or functions described herein. The instructions (226) can also reside, completely or at least partially, within the main memory (204) and/or within the processing device (202) during execution thereof by the computer system (200), the main memory (204) and the processing device (202) also constituting machine-readable storage media. The machine-readable storage medium (224), data storage system (218), and/or main memory (204) can correspond to the memory sub-system (110) of FIG. 1.

In one embodiment, the instructions (226) include instructions to implement functionality corresponding to an error recovery manager (113) (e.g., the error recovery manager (113) described with reference to FIGS. 1-4). While the machine-readable storage medium (224) is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
- a communication interface;
- memory cells; and
- a controller, wherein in response to at least one command received in the communication interface, the controller is configured to:
  - store, in at least a first one of the memory cells and based on at least one command received in the communication interface, a first error recovery parameter associated with a first portion of the memory cells; and
  - store, in at least a second one of the memory cells and based on the at least one command, a second error recovery parameter associated with a second portion of the memory cells,
- wherein the controller is further configured to tolerate a first level of errors while accessing the first portion of the memory cells in accordance with the first error recovery parameter and configured to tolerate a second level of errors while accessing the second portion of the memory cells in accordance with the second error recovery parameter,
- wherein the first level is lower than the second level, and
- wherein data accessed in the first portion of the memory cells was written into the first portion of the memory cells prior to storage of the first error recovery parameter in the first one of the memory cells.

2. The apparatus of claim 1, wherein the first error recovery parameter is associated with a first data application type corresponding to first data stored in the first portion of the memory cells and the second error recovery parameter is associated with a second data application type corresponding to second data stored in the second portion of the memory cells.

3. The apparatus of claim 2, wherein the first data application type is an instruction code type.

4. The apparatus of claim 2, wherein the first data application type is a file system data type.

5. The apparatus of claim 2, wherein the first data application type is an instruction for an operating system type.

6. The apparatus of claim 2, wherein the first data application type is a meta data of a file system type.

7. The apparatus of claim 2, wherein the second data application types is at least one of a video data application type, audio application type, or image application type.

8. The apparatus of claim 1, wherein the first portion is a first namespace allocated from a storage capacity of the memory cells and the second portion is a second namespace allocated from the storage capacity of the memory cells.

9. The apparatus of claim 8, wherein the controller is configured to generate a namespace map for the first namespace and the second namespace based at least in part on the first error recovery parameter and the second error recovery parameter.

10. The apparatus of claim 9, wherein the namespace map defines mapping from a first logical block address space defined in the namespace to a portion of a second logical block address space defined in an imaginary namespace allocated on an entire capacity of the memory cells.

11. The apparatus of claim 9, wherein the controller is configured to create the namespace in response to the at least one command being received in the communication interface.

12. The apparatus of claim 9, wherein the controller is configured to create the namespace prior to the at least one command being received in the communication interface.

13. A non-transitory computer storage medium storing instructions which, upon execution by a controller configured in an apparatus having memory cells, cause the controller to:
- generate a namespace map defining a first namespace associated with a first portion of the memory cells and a second namespace associated with a second portion of the memory cells;
- receive a first command to read first data;
- determine, in response to receiving the first command and based at least in part on the namespace map, that the first data is located in the first namespace; and
- read the first data from the first portion of the memory cells according to a first level of error tolerance, the first level of error tolerance stored as an error tolerance parameter in at least a first one of the memory cells, wherein the first data read from the first portion of the memory cells is written into the first portion of the memory cells prior to storage of an error recovery parameter associated with the first level of error tolerance.

14. The non-transitory computer storage medium of claim 13, wherein the instructions further cause the controller to:
- receive a second command to read second data;
- determine, in response to receiving the second command and based at least in part on the namespace map, that the second data is located in the second namespace; and
- read the second data from the second portion of the memory cells according to a second level of error tolerance.

15. The non-transitory computer storage medium of claim 14, wherein the first level of error tolerance and the second level of error tolerance are different from one another.

16. The non-transitory computer storage medium of claim 15, wherein the first level of error tolerance is associated with a first data application type corresponding to first data stored in the first portion of the memory cells and the second level of error tolerance is associated with a second data application type corresponding to second data stored in the second portion of the memory cells.

17. The non-transitory computer storage medium of claim 16, wherein the first data application type is at least one of an instruction code type, a file system data type, an operating system type, or a meta data of a file system type.

18. The non-transitory computer storage medium of claim 17, wherein the second data application type is at least one of a video data application type, audio application type, or image application type.

19. An apparatus, comprising:

memory cells; and a controller, wherein in response to at least one command received at the controller, the controller is configured to:

store first data into a first namespace allocated on a first portion of the memory cells;

store, in at least a first one of the memory cells, a first error recovery parameter associated with the first namespace;

store second data into a second namespace allocated on a second portion of the memory;

store, in at least a second one of the memory cells, a second error recovery parameter associated with the second namespace;

receive a command requesting data stored in the first portion or the second portion of the memory cells;

determine, in response to the command, whether to read the data from the first portion or the second portion of the memory cells using the first error recovery parameter or the second error recovery parameter, wherein the first error recovery parameter and the second error recovery parameter are different from one another; and read the data using the determined first error recovery parameter or the second error recovery parameter, wherein data accessed in the first portion of the memory cells was written into the first portion of the memory cells prior to storage of the first error recovery parameter in the first one of the memory cells.

20. The apparatus of claim 19, wherein the memory cells are a non-volatile type of memory.

* * * * *